(12) United States Patent
Khalitov et al.

(10) Patent No.: US 10,619,646 B2
(45) Date of Patent: Apr. 14, 2020

(54) ELONGATED AIR JET DEVICE AND METHOD

(71) Applicant: Twin City Fan Companies, Ltd., Plymouth, MN (US)

(72) Inventors: Daniel Khalitov, St. Louis Park, MN (US); Radha Krishna Ganesh, Rogers, MN (US); Daniel Richard Schulz, Saint Michael, MN (US); Jeffrey William Robinson, West Chester, OH (US)

(73) Assignee: Twin City Fan Companies, Ltd., Plymouth, MN (US)

( * ) Notice: Subject to any disclaimer, the term of this patent is extended or adjusted under 35 U.S.C. 154(b) by 457 days.

(21) Appl. No.: 15/380,926

(22) Filed: Dec. 15, 2016

(65) Prior Publication Data

US 2017/0175765 A1 Jun. 22, 2017

Related U.S. Application Data

(60) Provisional application No. 62/385,691, filed on Sep. 9, 2016, provisional application No. 62/268,145, filed on Dec. 16, 2015.

(51) Int. Cl.
*F04D 29/44* (2006.01)
*F04D 17/16* (2006.01)
(Continued)

(52) U.S. Cl.
CPC ............ *F04D 29/441* (2013.01); *B60S 3/002* (2013.01); *F04D 17/16* (2013.01); *F04D 25/166* (2013.01);
(Continued)

(58) Field of Classification Search
CPC ........ F04D 29/441; F04D 17/16; F04D 29/28; F04D 29/281; F04D 29/282;
(Continued)

(56) References Cited

U.S. PATENT DOCUMENTS 3,705,435 A   12/1972   Kulmer
5,199,846 A   4/1993   Fukasaku et al.
(Continued)

FOREIGN PATENT DOCUMENTS

EP        0872643 A2    10/1998
WO   WO-2017106530 A1    6/2017

OTHER PUBLICATIONS

"International Application Serial No. PCT/US2016/066977, International Preliminary Report on Patentability dated Jun. 28, 2018", 9 pgs.

(Continued)

*Primary Examiner* — Jacob M Amick
(74) *Attorney, Agent, or Firm* — Schwegman Lundberg & Woessner, P.A.

(57) ABSTRACT

A fan assembly, and associated methods are shown that may include tapering configurations in a nozzle assembly. Configurations are shown that are optimized for thrust. Examples of assemblies and methods are shown that include sound attenuating materials and jagged edges to reduce noise. Configurations are shown that provide a substantially constant or increasing air velocity. Configurations are also shown that provide a static pressure of 120 percent or less of a given dynamic pressure.

21 Claims, 9 Drawing Sheets

(51) Int. Cl.
| | |
|---|---|
| *F04D 29/42* | (2006.01) |
| *F04D 29/28* | (2006.01) |
| *F04D 29/68* | (2006.01) |
| *B60S 3/00* | (2006.01) |
| *F04D 25/16* | (2006.01) |
| *F04D 29/66* | (2006.01) |

(52) U.S. Cl.
CPC ....... *F04D 29/281* (2013.01); *F04D 29/4226* (2013.01); *F04D 29/663* (2013.01); *F04D 29/681* (2013.01)

(58) Field of Classification Search
CPC .. F04D 29/283; F04D 29/4226; F04D 29/663; F04D 25/166; B60S 3/002
See application file for complete search history.

(56) References Cited

U.S. PATENT DOCUMENTS

| | | | |
|---|---|---|---|
| 5,535,475 A | 7/1996 | Sauter | |
| 6,123,503 A * | 9/2000 | Belanger | B60S 3/002 415/127 |
| 2002/0048673 A1* | 4/2002 | Yokoyama | B32B 5/20 428/319.9 |
| 2008/0232958 A1 | 9/2008 | Weyandt | |
| 2012/0063899 A1* | 3/2012 | Ikeda | F04D 25/088 416/146 R |
| 2015/0274134 A1* | 10/2015 | Turner | B60S 3/04 134/103.2 |

OTHER PUBLICATIONS

"International Application Serial No. PCT/US2016/066977, International Search Report dated Apr. 12, 2017", 5 pgs.

"International Application Serial No. PCT/US2016/066977, Invitation to Pay Add'l Fees and Partial Search Report dated Jan. 24, 2017", 2 pgs.

"International Application Serial No. PCT/US2016/066977, Written Opinion dated Apr. 12, 2017", 7 pgs.

* cited by examiner

ELONGATED AIR JET DEVICE AND METHOD

RELATED APPLICATIONS

This application claims the benefit of priority to U.S. Provisional Patent Application Ser. No. 62/268,145, filed Sep. 9, 2016, and U.S. Provisional Patent Application Ser. No. 62/385,691, filed Dec. 16, 2015, the contents of which are incorporated herein by reference in their entireties.

TECHNICAL FIELD

Embodiments described herein generally relate to fan assemblies and devices that utilize fan assemblies. Specific embodiments may include elongated air jet devices for use in applications including, but not limited to, car wash dryers.

BACKGROUND

Fan assemblies with nozzles may be used in any number of applications. In one application, fan assemblies with nozzles are used to dry cars in an automatic car wash. Efficient fan assemblies for use in applications such as car wash dryers are desired. Reducing noise in fan assemblies for use in applications such as car wash dryers are desired.

DESCRIPTION OF EMBODIMENTS

Figure 1:
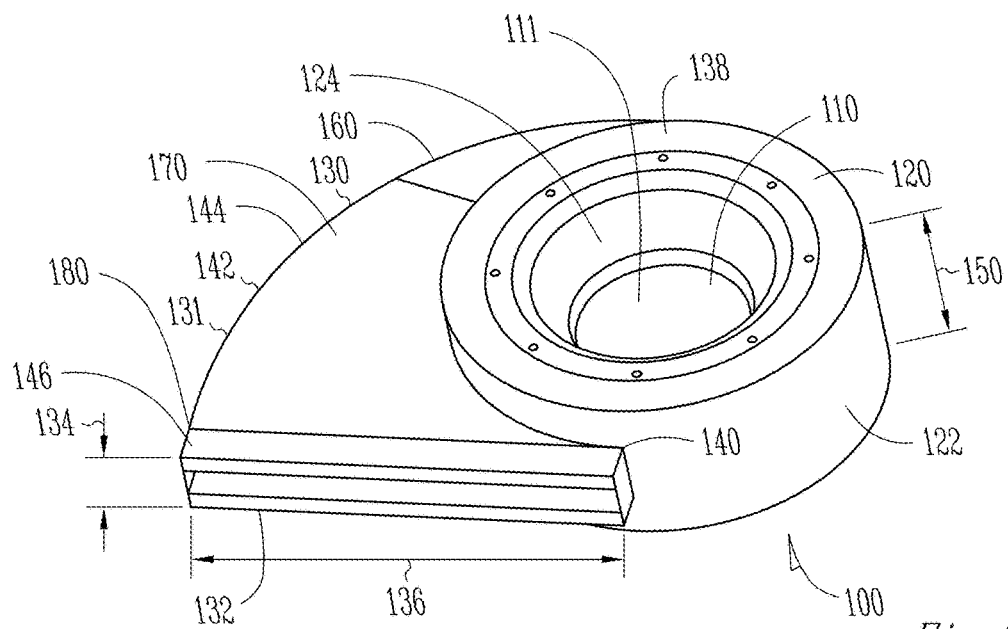
FIG. 1 shows a fan assembly according to an example of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

FIG. 1 shows a fan assembly 100 according to one example. The fan assembly 100 includes an impeller 110. In FIG. 1, the impeller 110 is substantially hidden from view within a housing 120, however, the impeller is closely followed by the housing 120, which gives a close approximation of an outer diameter 111, and a thickness 150 of the impeller 110. The housing 120 includes a cylindrical wall 122 that substantially follows the outer diameter 111 of the impeller. The housing 120 further includes a passage that defines an inlet opening 124.

A nozzle 130 is further shown in FIG. 1. In one example, the nozzle is separately attached to the housing 120, and is removable. In one example, the nozzle 130 is integrally formed with the housing 120. The nozzle 130 includes a terminal end 132. In one example, the terminal end 132 is rectangular in shape, and includes a width 134 and a length 136.

The nozzle 130 of FIG. 1 illustrates a first gradual transition 142. The first gradual transition 142 begins to taper from point 138, where the housing is substantially the same thickness 150 as the impeller 110. The first gradual transition ends at point 140, where the nozzle is narrowed to width 134, that is narrower than the thickness 150.

The nozzle 130 of FIG. 1 also illustrates a second gradual transition 144. The second gradual transition 144 also begins to taper from point 138, and extends from the point 138 in an expanding curve to point 146 at a first end of the length 136 of the terminal end 132.

In one example, the nozzle 130 is configured to optimize thrust, in contrast to optimizing other design parameters, such as velocity. Examples of the present invention recognize that after discharge, much of this velocity is lost in a turbulent jet. Theoretically, in such jets, the only quantity preserved is overall thrust, which is typically used as a performance indicator for jet tunnel fans. In contrast to optimizing velocity, in one example of the present invention configurations are designed to maximize thrust of fans and blowers equipped with converging nozzles.

To optimize nozzle outlet area for the best thrust for a given fan design and performance, one must first express thrust in terms that are independent on the fan outlet area A:

$$\text{THRUST} = P_V A = \rho Q V_{OUT} = C_2 Q \sqrt{P_V} = C_2 Q \sqrt{P_T - P_S} \tag{1}$$

where $\rho$ is air density, $V_{OUT}$ is fan outlet velocity, $Q$ is airflow, $P_S$, $P_T$, and $P_V$ are fan static, total, and velocity pressure respectively. $C_2$ is a constant that incorporates air density, velocity pressure losses, and any possible unit conversion constants. Note that fan airflow $Q$ and total pressure $P_T$ are obtained from a fan air test curve whereas static pressure $P_S$ is determined from system design specifications. Once maximum thrust values are determined from fan curve using Eqn (1) the corresponding nozzle outlet area is then calculated as:

$$A = \frac{Q}{1097.8 \sqrt{\frac{P_T - P_S}{\rho}}} \text{[IP Units]} = \frac{Q}{\sqrt{2 \frac{P_T - P_S}{\rho}}} \text{[SI Units]} \tag{2}$$

Figure 2A:
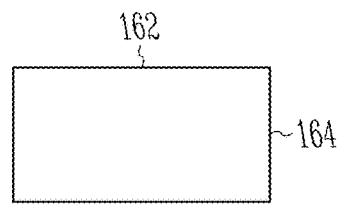
FIG. 2A-2C show cross sections of portions of the fan assembly from FIG. 1 according to an example of the invention.
Figure 2B:
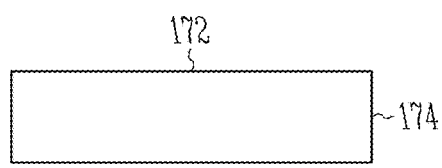
Figure 2C:
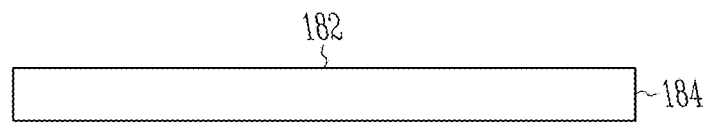

FIGS. 2A-2C illustrate one example of a design configuration that improves thrust. FIG. 2A shows a cross section area taken along the nozzle 130 at point 160 of FIG. 1. FIG. 2B shows a cross section area taken along the nozzle 130 at point 170 of FIG. 1. FIG. 2C shows a cross section area taken along the nozzle 130 at point 180 of FIG. 1.

In the example of FIGS. 2A-2C, a cross sectional area remains substantially constant from points 160, 170, and 180 even though the cross sectional shape is changing to become thinner as the cross sections approach the terminal end 132. Specifically the area of the cross section in FIG. 2A is the width 164 multiplied by the length 162. Likewise, the area of the cross section in FIG. 2B is the width 174 multiplied by the length 172. Likewise, the area of the cross section in FIG. 2C is the width 184 multiplied by the length 182. Although the shape of the cross sections are changing, the areas as defined above remain substantially constant. In one example, such a design constraint improves thrust.

Although a rectangular cross section is used as an example to illustrate how cross section shapes may change while a cross sectional area remains substantially constant, the invention is not so limited. One of ordinary skill, having the benefit of the present disclosure, will recognize that other curved, mixed curved and linear, complex, etc. cross sectional shapes are possible, and that they may vary along the nozzle, while a cross sectional area remains substantially constant.

In one example, as illustrated in FIG. 1, the nozzle 130 includes a sound attenuating material 131 as a part of the nozzle. In one example, the sound attenuating material includes a polymeric material. In one example, the sound attenuating material includes a closed cell foamed polymeric material. In one example with a removable nozzle portion, sheets of sound attenuating material are attachable to an open framework of support members that define a shape of the nozzle as shown in FIG. 1. In this example, airflow through the nozzle is in direct contact with the sound attenuating material through the openings in the support members on an inside of the nozzle 130. In selected examples, an additional metal portion may be secured over an outside of the sound attenuating material to add structure, if needed.

Figure 3A:
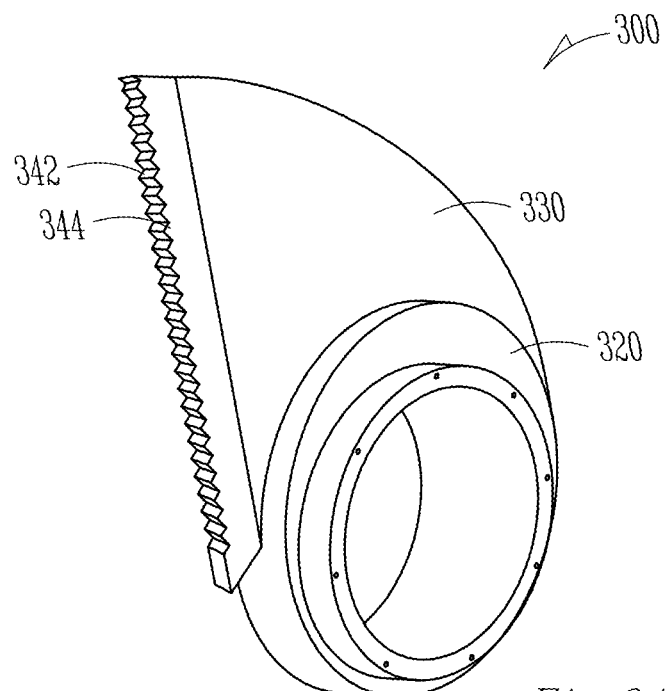
FIG. 3A shows another fan assembly according to an example of the invention.

FIG. 3A shows another example fan assembly 300 according to an embodiment of the invention. Similar to the example shown in FIG. 1, the fan assembly 300 includes a housing 320 with a nozzle 330. In the example shown in FIG. 3A, a terminal end 342 of the nozzle 330 includes a jagged edge 344. In one example, the jagged edge 344 provides noise reduction to the fan assembly 300. In one example the jagged edge is located on a portion of the terminal end 342 of the nozzle. In one example, the jagged edge is located on an entire periphery of the terminal end 342 of the nozzle. In selected examples, both a jagged edge 344 and sound attenuating material are used in a nozzle to reduce noise in a fan assembly during operation. The jagged edge 344 shown in FIG. 3A may be incorporated into any of the fan housing configurations in the present disclosure.

Figure 3B:
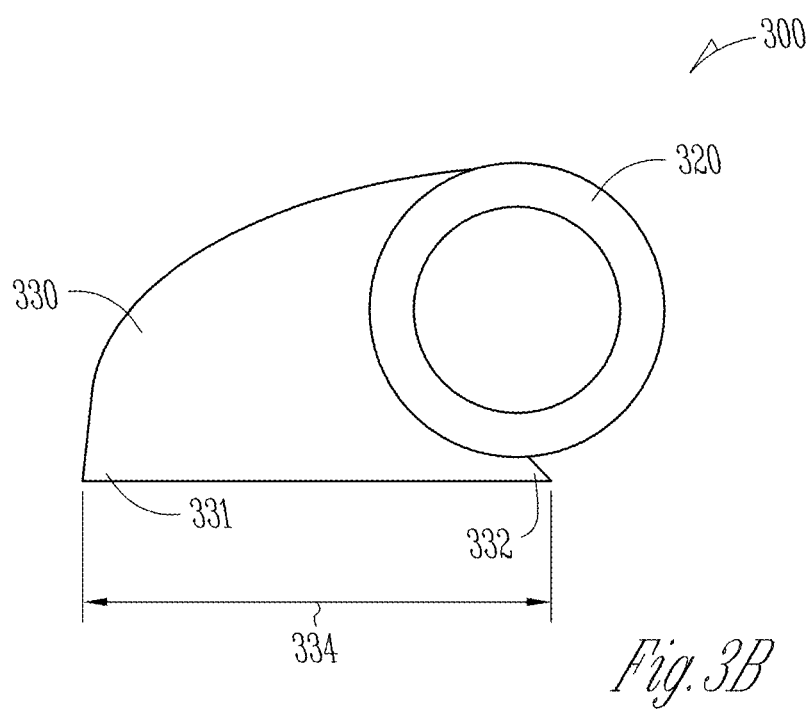
FIG. 3B shows the fan assembly from FIG. 3A according to an example of the invention.

FIG. 3B shows a front view of the fan assembly 300 from FIG. 3A. In one example, a first end 331 and a second end of the terminal end 342 of the nozzle 330 are shown. In the example of FIG. 3B, the second end 332 of the nozzle 330 is configured to direct air in a diverging length 334 after exiting the nozzle. In one example, the first end 331 of the nozzle 330 is configured to substantially not diverge, while the second end 332 of the nozzle 330 is configured to diverge, as shown in FIG. 3B.

Figure 4:
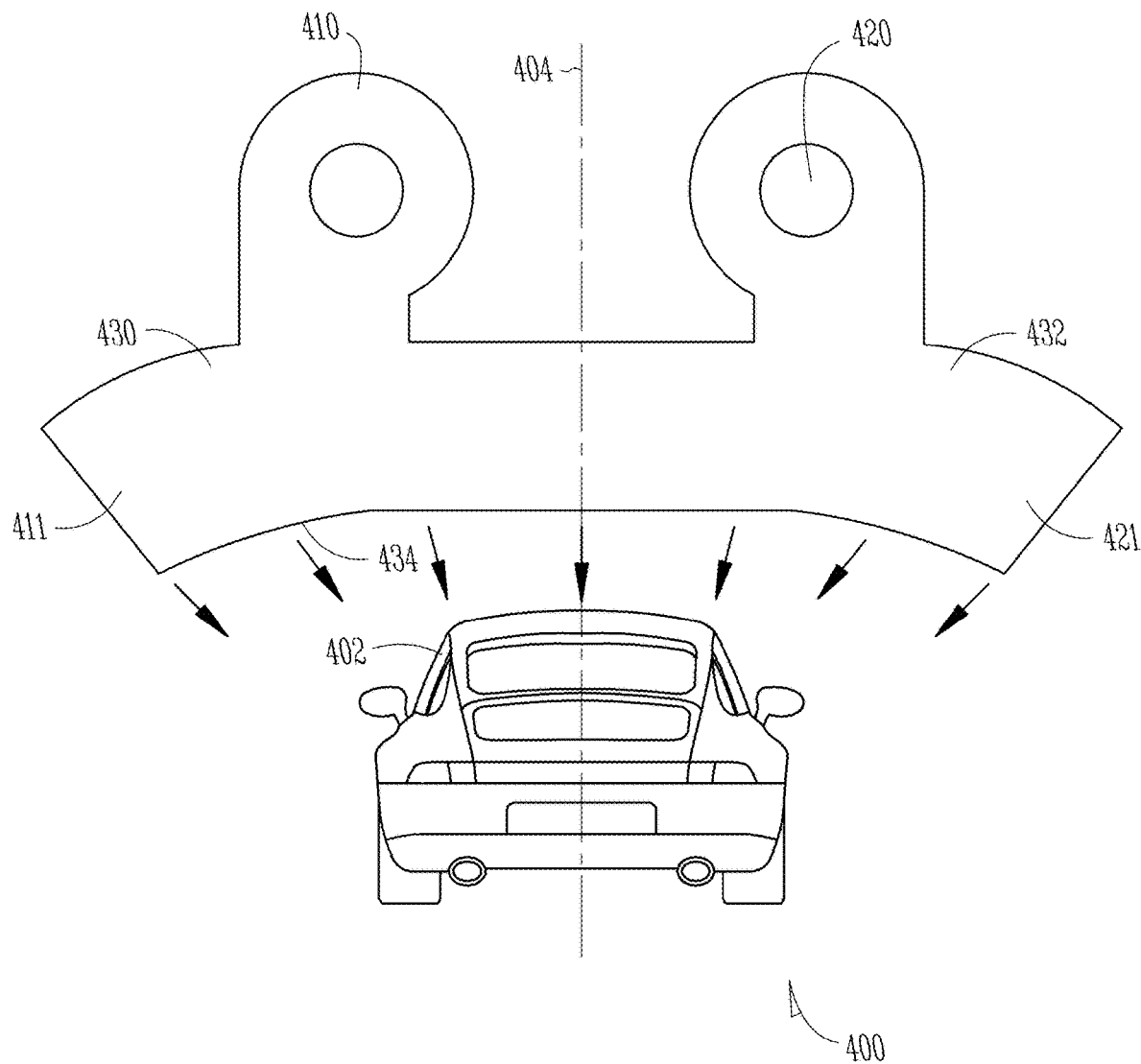
FIG. 4 shows a car wash dryer according to an example of the invention.

One advantage of such a configuration is that the diverging end 332 can be configured to cover the region under the fan motor as shown in FIG. 3B, while the first end 331 may be butted up against a second fan assembly as illustrated in more detail in FIG. 4. Having one or more ends of a nozzle 330 provide a diverging air flow may provide a consistent, full coverage blade of air that is more effective at blowing off certain objects such as cars in a car wash.

FIG. 4 shows a car wash dryer 400. In one example, the car wash dryer 400 includes one or more fan assemblies as described in example embodiments above. FIG. 4 shows a first fan assembly 410 and a second fan assembly 420. In one example, the fan assemblies include housings as described in one or more examples above. In one example, the first fan assembly 410 and the second fan assembly 420 include a jagged edge on a terminal end of one or more nozzles. In one example, a first nozzle 430 is associated with the first fan assembly 410, and a second nozzle 432 is associated with the second fan assembly 420. In one example, a single integrated nozzle is coupled to both the first fan assembly 410 and the second fan assembly 420.

In one example, a diverging air flow is positioned at a periphery 411, 421 of the nozzles 430, 432, in one example non-diverging air flow is positioned at junction 404 where air flow from the first nozzle 430 and the second nozzle 432 meet. In this way, the air from from adjacent nozzles does not interfere and cause unwanted turbulence.

FIG. 4 further illustrates a car 402 in the process of being dried by the car wash dryer 400. In one example, the nozzles 430, 432 at least partially curve around the car 402 as illustrated in the Figure.

In another configuration, a fan assembly is described that provides a substantially constant or increasing air velocity. Such a configuration has a number of advantages, including lower mechanical stress put on a fan housing. In standard configurations, an air velocity is lowered temporarily within the housing, then the air velocity is accelerated at an exit of a nozzle. The change in air velocity may cause a pressure pulse within the housing that may cause unwanted stress, such as fatigue stress, on housing components.

Figure 5:
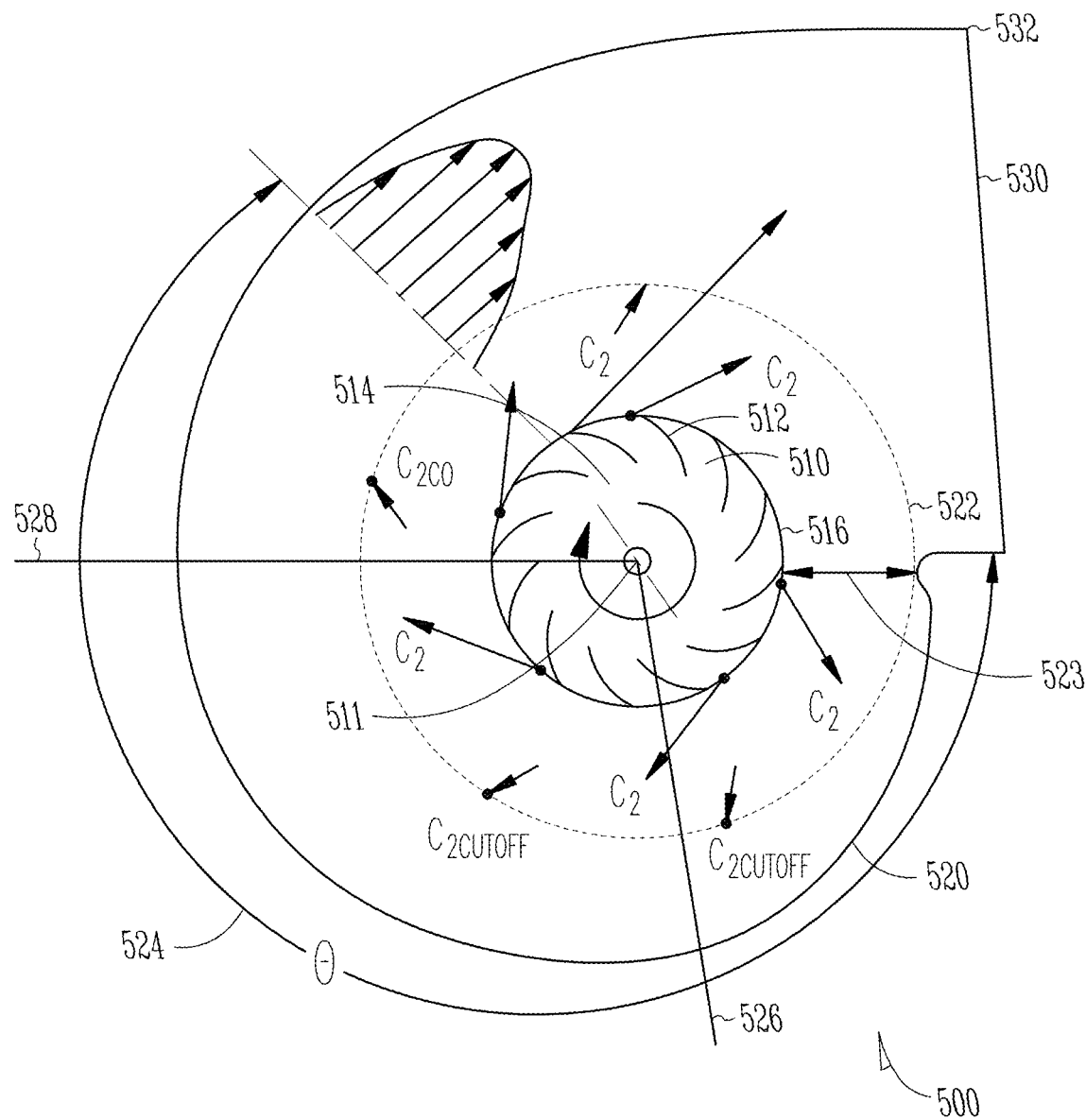
FIG. 5 shows a cross section diagram of a fan assembly according to an example of the invention.

FIG. 5 shows a fan assembly 500 according to one example. The fan assembly 500 includes an impeller 510. In FIG. 5, the impeller 510 is located within a housing 520. The impeller 510 shown in FIG. 5 includes an axis of rotation 511 and a number of blades 512. The impeller 510 is configured to draw air into a central air inlet region 514, and to expel air on a periphery 516 of the impeller 510.

In one example the housing 520 may be formed from a solid polymeric material. In other examples, the housing 520 may be formed from metal, such as steel or aluminum. In other examples, the housing 520 may be formed from a composite material such as fiberglass, or carbon fiber composite.

The housing 520 is shown in cross section. A cutoff location 522 is shown where the housing 520 begins to diverge away from the periphery 514 of the impeller 510. While a space 523 is shown between the periphery 514 of the impeller 510 and the cutoff location 522, a dimension of the space 523 is not to scale. In practice, the space 523 may be smaller. The housing 520 in FIG. 5 is shown diverging away from the periphery 514 of the impeller 510, outwards to a nozzle opening 530 of the housing 520. Specifically, an outer edge of the housing 520 diverges from the cutoff location 522 to an outer point 532 of the nozzle opening 530.

The housing 520 can be described as including any number of cross sections taken at intersections along planes such as plane 526 and plane 528. Any given cross section can be defined by its angular location 524, ranging from $\theta=0$ degrees at the cutoff location 522 to a $\theta$ at the nozzle opening 530.

In one example, the housing cross sections are varied as the angle $\theta$ progresses from the cutoff location 522 to the nozzle opening 530. In one example the housing cross section geometries are configured to maintain or increase an air velocity within the housing as the air progresses angularly from the cutoff location 522 to the nozzle opening 530.

Figure 6:
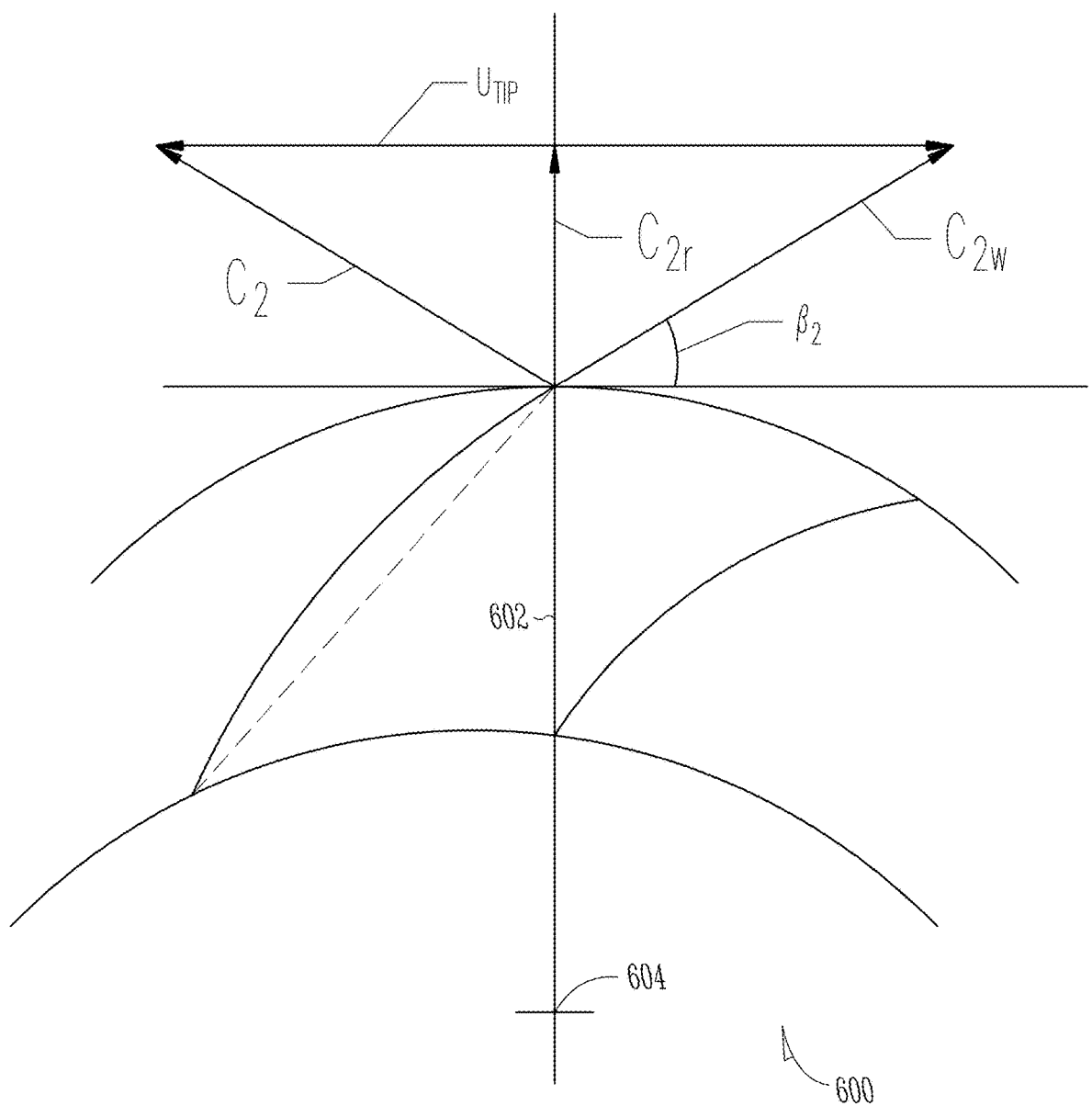
FIG. 6 shows a velocity vector diagram of a fan assembly according to an example of the invention.

In one example, the housing cross section geometries are determined using the following equations. Following from the thrust equations (1) and (2) above, the radial velocity component ($C_{2r}$) is derived in equation (3).

$$c_{2r} = \frac{Q}{\pi D_2 W_2} \qquad (3)$$

where $D_2$ and $W_2$ are diameter and width of tips of the impeller blades. From velocity triangles, the absolute magnitude of air velocity vector ($C_2$) can be estimated at the tip discharge using equation (4). One example of a velocity triangle 600 is illustrated in FIG. 6. An example impeller blade 602 is shown having an axis of rotation 604. The value $U_{tip}$ is illustrated as the tip velocity of the impeller blade. The absolute magnitude of air velocity vector ($C_2$) is comprised of the velocity vector components $U_{tip}$ and the radial velocity component ($C_{2r}$).

$$c_2 = c_{2r} \sqrt{\left(\frac{u_{TIP}}{c_{2r}} - \frac{1}{\tan\beta_2}\right) + 1} \qquad (4)$$

A velocity at the cutoff location ($C_{2CUTOFF}$) can be determined using equation (5), where $R_{TIP}$ is the radius of the impeller blade.

$$c_{2CUTOFF} = c_2\left(\frac{R_{TIP}}{R_{CUTOFF}}\right) = c_{2r}\left(\frac{R_{TIP}}{R_{CUTOFF}}\right)\sqrt{\left(\frac{u_{TIP}}{c_{2r}} - \frac{1}{\tan\beta_2}\right)^2 + 1} \qquad (5)$$

Figure 9:
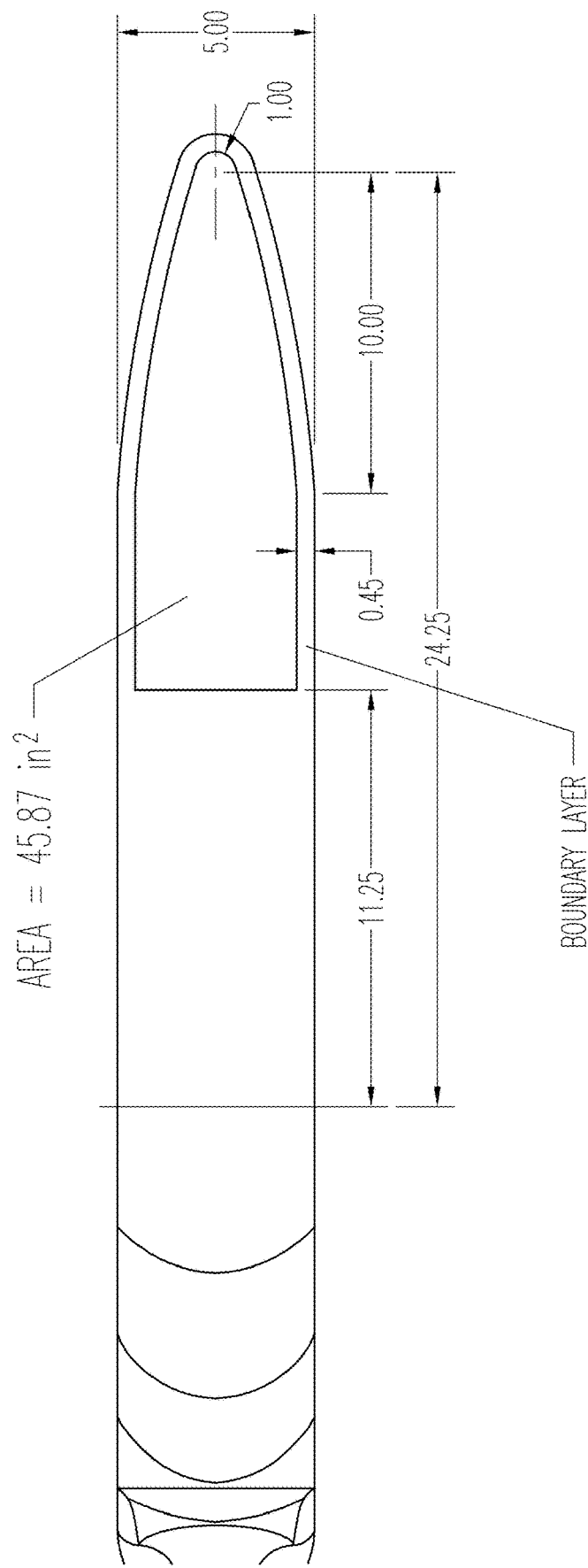
FIG. 9 shows an example cross section of a fan housing from a fan assembly according to an example of the invention.

Then, to maintain and/or gradually increase this velocity, one must calculate localized cross-sectional velocities within the housing. In one example, this calculation takes into account boundary layers, as shown in FIG. 9. Methods of estimating boundary layer thicknesses may vary. One of ordinary skill in the art, having the benefit of the present disclosure, will recognize how to include boundary layer calculations, and will be able to do so.

Figure 7:
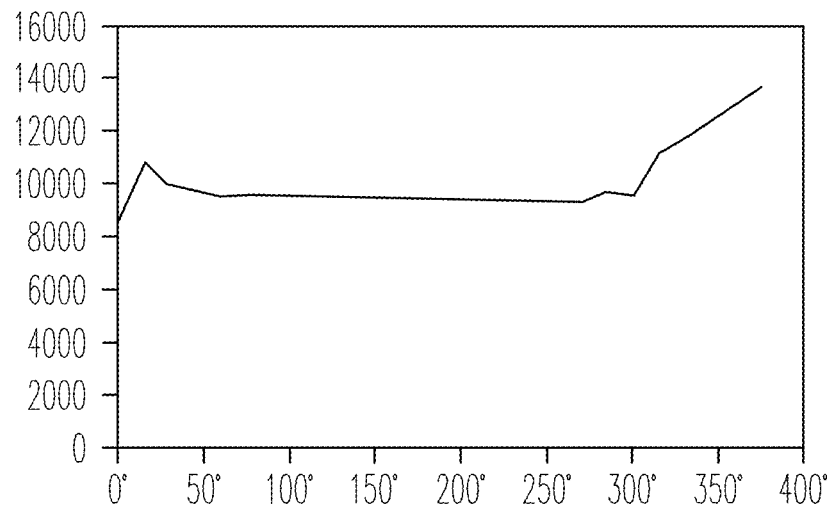
FIG. 7 shows a graph of air velocity from a fan assembly according to an example of the invention.

FIG. 7 shows air velocity data of a fan assembly according to an embodiment of the invention. The x-axis shows a θ as defined from the cutoff location of the housing to the nozzle opening, as described in FIG. 5 above. The y-axis shows air velocity in feet per minute (fpm). As can be seen in the Figure, the velocity is constant over the range of θ from zero to about 300 degrees, then increasing from about 300 degrees to exit from the housing. In the example shown, the housing design provides a constant velocity of about 10,000 feet per minute for an angular range between zero and 300 degrees.

Figure 8:
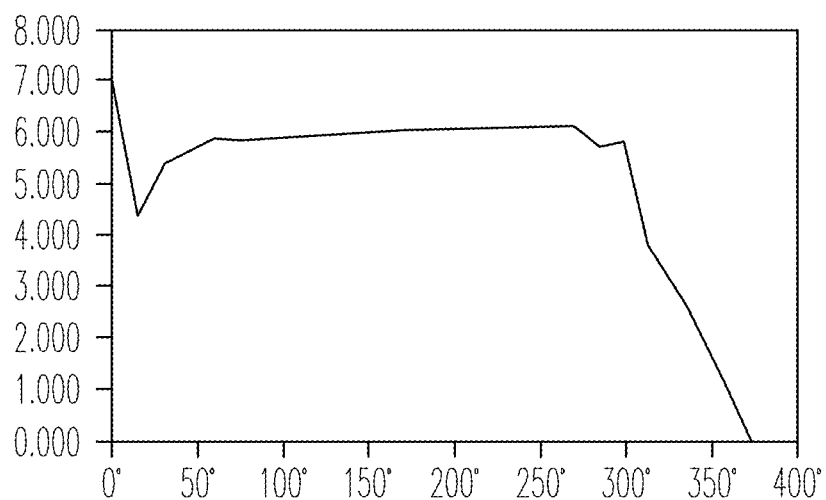
FIG. 8 shows a graph of static pressure from a fan assembly according to an example of the invention.

FIG. 8 shows static air pressure data of a fan assembly according to an embodiment of the invention. The x-axis shows a θ as defined from the cutoff location of the housing to the nozzle opening, as described in FIG. 5 above. The y-axis shows air pressure in inches water gauge (iwg). As can be seen in the Figure, the pressure is constant over the range of θ from zero to about 300 degrees, then decreasing from about 300 degrees to exit from the housing, in the example shown, the housing design provides a constant pressure of about 6.0 inches water gauge for an angular range between zero and 300 degrees.

In one example, the static pressure shown in FIG. 8 is one part of a total pressure where total pressure=static pressure+dynamic pressure. In one example, configurations provided according to the teaching of the present disclosure provide a housing that is configured to provide a static pressure of 120 percent or less of a given dynamic pressure as the air progresses angularly from the cutoff location to the nozzle opening.

For example, a fan assembly according to the data of FIG. 8 shows a static pressure of about 6.0 iwg. A dynamic pressure of the fan assembly modelled by FIG. 8 may be about 5.0 iwg. The static pressure of 6.0 iwg is calculated as 120 percent of the dynamic pressure (5.0 iwg).

As discussed above, configurations as described that provide a substantially constant or increasing air velocity have a number of advantages, including lower mechanical stress put on a fan housing. Configurations as shown reduce unwanted stress such as pressure pulses that may reduce a lifetime of housing or other fan assembly components.

Figure 10:
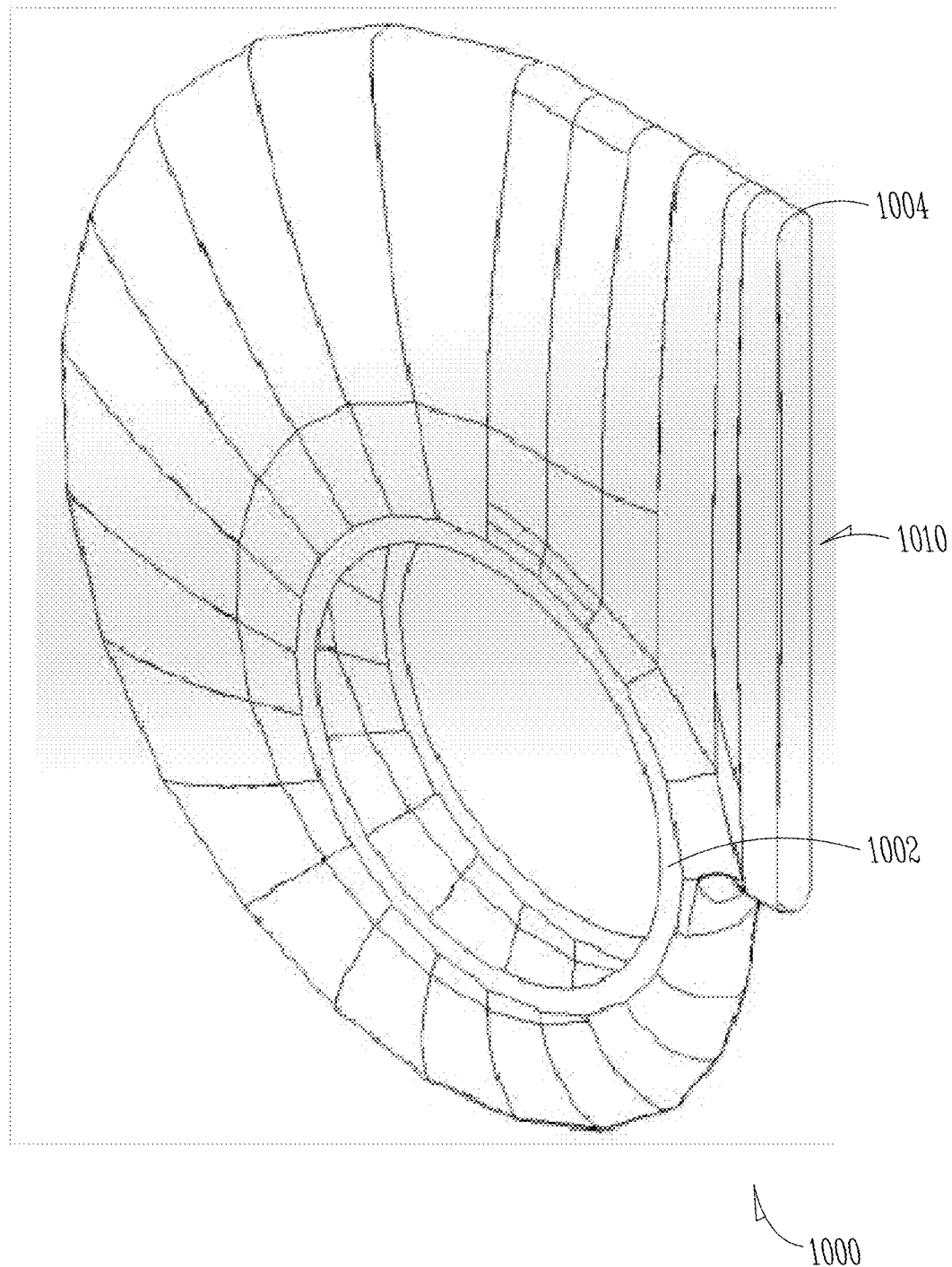
FIG. 10 shows an isometric view of the fan housing from FIG. 9, according to an example of the invention.

FIGS. 9 and 10 show one possible example of a fan housing 1000 according to an embodiment of the invention. FIG. 9 shows a cross section geometry taken in a manner as described above with respect to FIG. 5. In one example, the housing of FIGS. 9 and 10 may be used in a car wash dryer. Although dimensions are shown in inches, for the specific example, the invention is not so limited. Furthermore, although a generally flat cross section with a tapered end is shown as an example in FIG. 9, the invention is not so limited. For example, other fan assembly and housing configurations may include tubular cross sections, square cross sections, rectangular cross sections, or other geometries.

In the example fan housing 1000 shown in FIG. 10, a cutoff location 1002 and a nozzle opening 1004 are similar to the cutoff location 522 and the outer point 532 from the example of FIG. 5. In the example of FIG. 10, the nozzle 1010 includes a blade shape. A blade shape may be useful for car wash dryer applications. In use, an air flow exiting the nozzle 1010 will cover a larger area of a car with a more consistent air flow. This facilitates more efficient drying of the car, while using fewer fan assemblies. In one example, a fan assembly as described in FIGS. 5-10 above may be used in a car wash configuration similar to the assembly 1200 as shown in FIG. 12.

Figure 12:
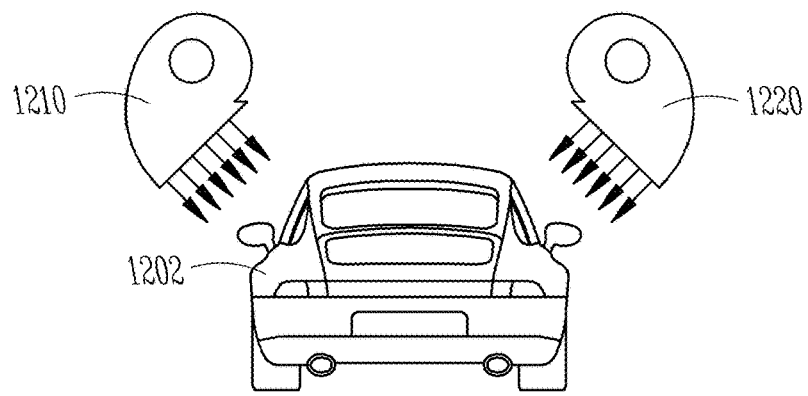
FIG. 12 shows a car wash dryer, according to an example of the invention.

FIG. 12 shows a car wash dryer 1200. In one example, the car wash dryer 1200 includes one or more fan assemblies as described in example embodiments above. FIG. 12 shows a first fan assembly 1210 and a second fan assembly 1220. In one example, the fan assemblies include housings as described in one or more examples above. FIG. 12 further illustrates a car 1202 in the process of being dried by the car wash dryer 1200.

In one example, one or more of the fan assemblies 1210, 1220 includes a fan housing configured to optimize thrust. In one such example, as described at least in FIGS. 2A-2C above, the shape of a cross section changes, while an area remains substantially constant. In one example, one or more of the fan assemblies 1210, 1220 includes a fan housing configured to provide constant or increasing air velocity. In one such example, as described at least in FIG. 5 above, an advantage includes lower mechanical stress put on a fan housing. In one example, one or more of the fan assemblies 1210, 1220 include a jagged edge on a terminal end of one or more nozzles.

Figure 11:
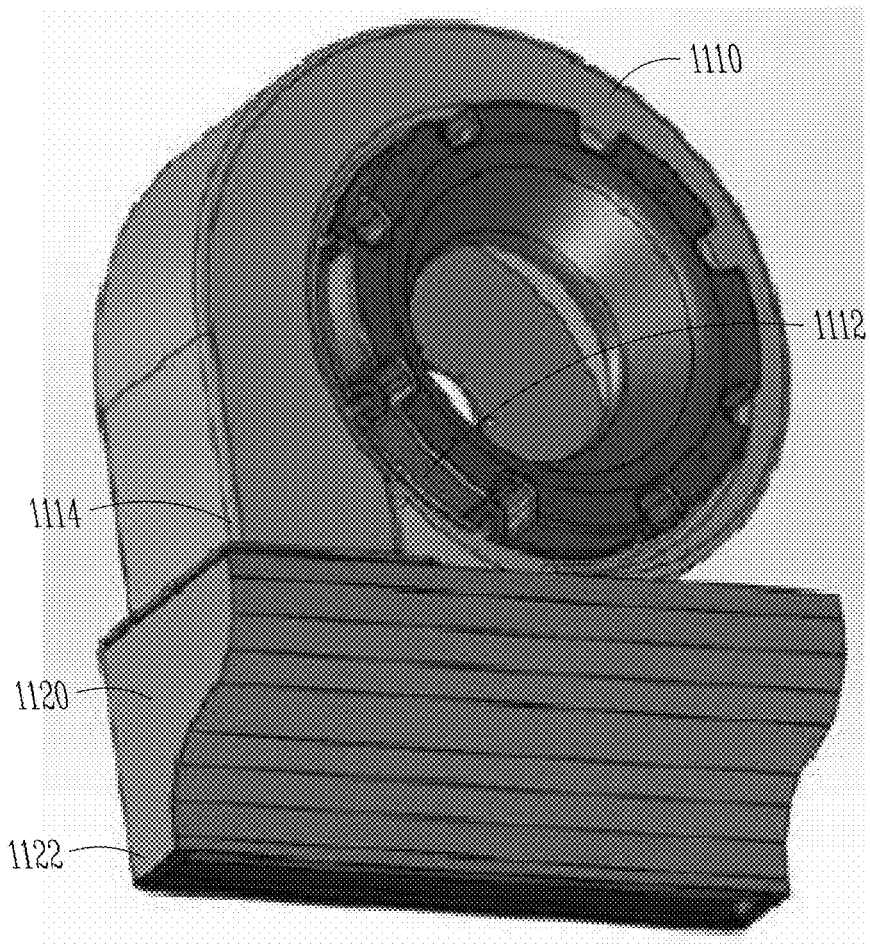
FIG. 11 shows an isometric view of a fan housing, according to an example of the invention.

The example fan housing 1000 shown in FIG. 10 includes an integrated housing that is formed as a single unit. In another example, the housing may include a main housing portion and a removable nozzle portion. FIG. 11 shows a fan assembly 1100 that includes a main housing portion 1110 and a removable nozzle portion 1120. As described in examples above, the main housing portion 1110 may be configured to provide a substantially constant or increasing air velocity between a cutoff location 1112 and a main housing end 1114. In the example of FIG. 11, the removable nozzle portion 1120 further continues the housing before air exits as location 1122.

In one example, the main housing portion 1110 and the removable nozzle portion 1120 are both configured to provide a substantially constant or increasing air velocity. In one example, the removable nozzle portion 1120 may be retrofitted onto an earlier version of a fan housing that is less optimized according to examples of the invention. In such an example, only the removable nozzle portion 1120 may be optimized to provide a substantially constant or increasing air velocity.

To better illustrate the method and apparatuses disclosed herein, a non-limiting list of embodiments is provided here:

Example 1 includes a fan assembly. The fan assembly includes an impeller having an outer diameter, a thickness, and an axis of rotation, the impeller including a number of blades configured to draw air into a central air inlet region, and to expel air on a periphery of the impeller, a housing substantially surrounding the impeller. The housing includes a cylindrical wall substantially following the outer diameter of the impeller, an inlet opening adjacent to the air inlet region of the impeller, a nozzle, having a terminal end with a width less than the thickness of the impeller and a length longer than the width, a first gradual transition portion that tapers from the thickness of the impeller to the width of the terminal end, and a second gradual transition portion that extends from the outer diameter of the impeller in an expanding curve to a first end of the length of the terminal end.

Example 2 includes the fan assembly of example 1 wherein a cross sectional area of the nozzle between the impeller and the terminal end is substantially constant.

Example 3 includes the fan assembly of any one of examples 1-2, wherein the length of the nozzle extends along a tangent to the cylindrical wall of the housing.

Example 4 includes the fan assembly of any one of examples 1-3, wherein the length of the nozzle is longer than a radius of the impeller.

Example 5 includes the fan assembly of any one of examples 1-4, wherein a second end of the nozzle is configured to direct air in a diverging length after exiting the nozzle.

Example 6 includes the fan assembly of any one of examples 1-5, wherein the nozzle is removable from the housing.

Example 7 includes the fan assembly of any one of examples 1-6, wherein the nozzle is integrated with the housing.

Example 8 includes a fan assembly. The fan assembly includes an impeller having an outer diameter, a thickness, and an axis of rotation, the impeller including a number of blades configured to draw air into a central air inlet region, and to expel air on a periphery of the impeller, and a housing substantially surrounding the impeller. The housing includes a cylindrical wall substantially following the outer diameter of the impeller, an inlet opening adjacent to the air inlet region of the impeller, a nozzle, having a terminal end with a width less than the thickness of the impeller and a length longer than the width, a first gradual transition portion that tapers from the thickness of the impeller to the width of the terminal end, a second gradual transition portion that extends from the outer diameter of the impeller in an expanding curve to a first end of the length of the terminal end, and a polymer based sound attenuating material covering at least a portion of an interior of the housing adjacent to the terminal end of the nozzle.

Example 9 includes the fan assembly of example 8, further including a jagged edge on at least a portion of the terminal end of the nozzle.

Example 10 includes the fan assembly of any one of examples 8-9, wherein the polymer based sound attenuating material includes a closed cell foam material.

Example 11 includes a fan assembly. The fan assembly includes an impeller having an outer diameter, a thickness, and an axis of rotation, the impeller including a number of blades configured to draw air into a central air inlet region, and to expel air on a periphery of the impeller and a housing substantially surrounding the impeller. The housing includes a cylindrical wall substantially following the outer diameter of the impeller, an inlet opening adjacent to the air inlet region of the impeller, a nozzle, having a terminal end with a width less than the thickness of the impeller and a length longer than the width, a first gradual transition portion that tapers from the thickness of the impeller to the width of the terminal end, a second gradual transition portion that extends from the outer diameter of the impeller in an expanding curve to a first end of the length of the terminal end, and a jagged edge on at least a portion of the terminal end of the nozzle.

Example 12 includes the fan assembly of example 11, further including a polymer based sound attenuating material covering at least a portion of an interior of the housing adjacent to the nozzle.

Example 13 includes the fan assembly of any one of examples 10-11, wherein the jagged edge is formed on an entire periphery of the terminal end of the nozzle.

Example 14 includes a car wash dryer. The car wash dryer includes a pair of fan assemblies, each fan assembly including an impeller having an outer diameter, a thickness, and an axis of rotation, the impeller including a number of blades configured to draw air into a central air inlet region, and to expel air on a periphery of the impeller, and a housing substantially surrounding the impeller. The housing includes a cylindrical wall substantially following the outer diameter of the impeller, an inlet opening adjacent to the air inlet region of the impeller, a nozzle, having a terminal end with a width less than the thickness of the impeller and a length longer than the width, a gradual transition portion that tapers from the thickness of the impeller to the width of the terminal end, and wherein the nozzles of the pair of fan assemblies are coupled end to end to form a combined nozzle length equal to or wider than a car to be dried.

Example 15 includes the car wash dryer of example 14, wherein a cross sectional area of the nozzle in each of the fan assemblies between each impeller and each terminal end is substantially constant.

Example 16 includes the car wash dryer of any one of examples 14-15, wherein the nozzles of the pair of fan assemblies are configured to at least partially curve around a car to be dried.

Example 17 includes the car wash dryer of any one of examples 14-16, wherein the nozzles of the pair of fan assemblies are integrally formed.

Example 18 includes a fan assembly. The fan assembly includes an impeller having an axis of rotation, the impeller including a number of blades configured to draw air into a central air inlet region, and to expel air on a periphery of the impeller. The fan assembly includes a housing substantially surrounding the impeller, the housing including a cutoff location where the housing begins to diverge away from the periphery of the impeller, and a nozzle opening at a second angular location, wherein a housing cross section geometry is configured to maintain or increase an air velocity within the housing as the air progresses angularly from the cutoff location to the nozzle opening.

Example 19 includes the fan assembly of example 18, wherein the housing cross section geometry is configured to provide a static pressure of 120 percent or less of a given dynamic pressure as the air progresses angularly from the cutoff location to the nozzle opening.

Example 20 includes the fan assembly of any one of examples 18-19, wherein the nozzle opening is blade shaped.

Example 21 includes the fan assembly of any one of examples 18-20, wherein the housing is integrated as a single unit.

Example 22 includes the fan assembly of any one of examples 18-21, wherein the housing includes a main housing portion and a removable nozzle portion.

Example 23 includes the fan assembly of any one of examples 18-22, wherein the housing is substantially formed from a polymeric material.

Example 24 includes a fan assembly. The fan assembly includes an impeller having an axis of rotation, the impeller including a number of blades configured to draw air into a central air inlet region, and to expel air on a periphery of the impeller. The fan assembly includes a housing substantially surrounding the impeller, the housing including a cutoff location where the housing begins to diverge away from the periphery of the impeller, and a nozzle opening at a second angular location, wherein a housing cross section geometry is configured to provide a static pressure of 120 percent or less of a given dynamic pressure as the air progresses angularly from the cutoff location to the nozzle opening.

Example 25 includes the fan assembly of example 24, wherein the nozzle opening is blade shaped.

Example 26 includes the fan assembly of any one of examples 24-25 wherein the housing is integrated as a single unit.

Example 27 includes the fan assembly of any one of examples 24-26 wherein the housing includes a main housing portion and a removable nozzle portion.

Example 28 includes the fan assembly of any one of examples 24-27 wherein the housing is substantially formed from a polymeric material.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A fan assembly, comprising:
   an impeller having an outer diameter, a thickness, and an axis of rotation, the impeller including a number of blades configured to draw air into a central air inlet region, and to expel air on a periphery of the impeller;
   a housing substantially surrounding the impeller, the housing including:
   a cylindrical wall substantially following the outer diameter of the impeller;
   an inlet opening adjacent to the air inlet region of the impeller;
   a nozzle, having a terminal end with a width less than the thickness of the impeller and a length longer than the width;
   a first gradual transition portion that tapers from the thickness of the impeller to the width of the terminal end; and
   a second gradual transition portion that extends from the outer diameter of the impeller in an expanding curve to a first end of the length of the terminal end;
   wherein a cross sectional area of the nozzle between the impeller and the terminal end is constant.

2. The fan assembly of claim 1, wherein the length of the nozzle extends along a tangent to the cylindrical wall of the housing.

3. The fan assembly of claim 1, wherein the length of the nozzle is longer than a radius of the impeller.

4. The fan assembly of claim 1, wherein a second end of the nozzle is configured to direct air in a diverging length after exiting the nozzle.

5. The fan assembly of claim 1, wherein the nozzle is removable from the housing.

6. The fan assembly of claim 1, wherein the nozzle is integrated with the housing.

7. A fan assembly, comprising:
an impeller having an outer diameter, a thickness, and an axis of rotation, the impeller including a number of blades configured to draw air into a central air inlet region, and to expel air on a periphery of the impeller;
a housing substantially surrounding the impeller, the housing including:
a cylindrical wall substantially following the outer diameter of the impeller;
an inlet opening adjacent to the air inlet region of the impeller;
a nozzle, having a terminal end with a width less than the thickness of the impeller and a length longer than the width;
a first gradual transition portion that tapers from the thickness of the impeller to the width of the terminal end; and
a second gradual transition portion that extends from the outer diameter of the impeller in an expanding curve to a first end of the length of the terminal end;
wherein a cross sectional area of the nozzle between the impeller and the terminal end is constant; and
a polymer based sound attenuating material covering at least a portion of an interior of the housing adjacent to the terminal end of the nozzle.

8. The fan assembly of claim 7, further including a jagged edge on at least a portion of the terminal end of the nozzle.

9. The fan assembly of claim 7, wherein the polymer based sound attenuating material includes a closed cell foam material.

10. A fan assembly, comprising:
an impeller having an outer diameter, a thickness, and an axis of rotation, the impeller including a number of blades configured to draw air into a central air inlet region, and to expel air on a periphery of the impeller;
a housing substantially surrounding the impeller, the housing including:
a cylindrical wall substantially following the outer diameter of the impeller;
an inlet opening adjacent to the air inlet region of the impeller;
a nozzle, having a terminal end with a width less than the thickness of the impeller and a length longer than the width;
a first gradual transition portion that tapers from the thickness of the impeller to the width of the terminal end; and
a second gradual transition portion that extends from the outer diameter of the impeller in an expanding curve to a first end of the length of the terminal end;
wherein a cross sectional area of the nozzle between the impeller and the terminal end is constant; and
a jagged edge on at least a portion of the terminal end of the nozzle.

11. The fan assembly of claim 10, further including a polymer based sound attenuating material covering at least a portion of an interior of the housing adjacent to the nozzle.

12. The fan assembly of claim 10, wherein the jagged edge is formed on an entire periphery of the terminal end of the nozzle.

13. A car wash dryer, comprising:
a pair of fan assemblies, each fan assembly including:
an impeller having an outer diameter, a thickness, and an axis of rotation, the impeller including a number of blades configured to draw air into a central air inlet region, and to expel air on a periphery of the impeller;
a housing substantially surrounding the impeller, the housing including:
a cylindrical wall substantially following the outer diameter of the impeller;
an inlet opening adjacent to the air inlet region of the impeller;
a nozzle, having a terminal end with a width less than the thickness of the impeller and a length longer than the width;
a gradual transition portion that tapers from the thickness of the impeller to the width of the terminal end;
wherein a cross sectional area of the nozzle between the impeller and the terminal end is constant; and
wherein the nozzles of the pair of fan assemblies are coupled end to end to form a combined nozzle length equal to or wider than a car to be dried.

14. The car wash dryer of claim 13, wherein a cross sectional area of the nozzle in each of the fan assemblies between each impeller and each terminal end is substantially constant.

15. The car wash dryer of claim 13, wherein the nozzles of the pair of fan assemblies are configured to at least partially curve around a car to be dried.

16. The car wash dryer of claim 13, wherein the nozzles of the pair of fan assemblies are integrally formed.

17. A fan assembly, comprising:
an impeller having an axis of rotation, the impeller including a number of blades configured to draw air into a central air inlet region, and to expel air on a periphery of the impeller;
a housing substantially surrounding the impeller, the housing including:
a cutoff location where the housing begins to diverge away from the periphery of the impeller; and
a nozzle opening at a second angular location, and a nozzle coupled to the nozzle opening, wherein a cross sectional area of the nozzle between the impeller and a terminal end of the nozzle is constant, wherein a housing cross section geometry is configured to provide a constant static pressure of 120 percent or less of a given dynamic pressure as the air progresses angularly from the cutoff location to the nozzle opening.

18. The fan assembly of claim 17, wherein the nozzle opening is blade shaped.

19. The fan assembly of claim 17, wherein the housing is integrated as a single unit.

20. The fan assembly of claim 17, wherein the housing includes a main housing portion and a removable nozzle portion.

21. The fan assembly of claim 17, wherein the housing is substantially formed from a polymeric material.

* * * * *